US012689171B2

(12) United States Patent
Green et al.

(10) Patent No.: US 12,689,171 B2
(45) Date of Patent: Jul. 21, 2026

(54) TEMPERATURE CONTROL FOR COILED GAIN FIBER IN FIBER AMPLIFIER

(71) Applicant: II-VI Delaware, Inc., Wilmington, DE (US)

(72) Inventors: Eric T. Green, Corning, NY (US); Aravanan Gurusami, Morgan Hill, CA (US); Joseph Mangano, Belfast, NY (US); Martin Seifert, New Hartford, CT (US)

(73) Assignee: II-VI Delaware, Inc., Wilmington, DE (US)

( * ) Notice: Subject to any disclaimer, the term of this patent is extended or adjusted under 35 U.S.C. 154(b) by 994 days.

(21) Appl. No.: 17/901,749

(22) Filed: Sep. 1, 2022

(65) Prior Publication Data

US 2024/0079839 A1     Mar. 7, 2024

(51) Int. Cl.
*H01S 3/00*          (2006.01)
*H01S 3/02*          (2006.01)
(Continued)

(52) U.S. Cl.
CPC ............ *H01S 3/0405* (2013.01); *H01S 3/025* (2013.01); *H01S 3/0407* (2013.01); *H01S 3/06758* (2013.01); *H01S 3/0064* (2013.01)

(58) Field of Classification Search
CPC ...... H01S 3/0405; H01S 3/025; H01S 3/0407; H01S 3/06758; H01S 3/0064
See application file for complete search history.

(56) References Cited

U.S. PATENT DOCUMENTS 8,493,651 B1 *   7/2013   Hu ...................... H01S 3/06754
                                                    359/341.1
9,787,048 B1    10/2017   Fidric et al.
(Continued)

FOREIGN PATENT DOCUMENTS

CN       104953447 A     9/2015
CN       107623244 A     1/2018
(Continued)

OTHER PUBLICATIONS

Wu, Jinming , et al., "Experimental Demonstration of the Influence of Cooling Temperature on the Thermal Mode Instability in the YB-Doped Fiber Oscillator", IEEE Photonics Journal, Oct. 2021, vol. 13, No. 5, 5-pgs.

(Continued)

*Primary Examiner* — Mark Hellner
(74) *Attorney, Agent, or Firm* — McDonnell Boehnen Hulbert & Berghoff LLP

(57) ABSTRACT

A temperature controller is used for a gain fiber of a fiber amplifier. The controller includes a heat transfer structure and one or more temperature sinks, such as cooling plates. The heat transfer structure supports the gain fiber and is disposed in thermal contact with it. Portions of the temperature sink(s) are disposed in different thermal conductivity with sections of the heat transfer structure. For example, the sinks may have different material properties and/or material thicknesses. Also, portions of the temperature sink(s) can have different cooling rates. The different thermal conductivities conduct the heat from parts of the gain fiber differently from one another. In the end, an onset of Stimulated Brillouin Scattering (SBS) on the laser light path can be mitigated by conducting heat from the gain fiber with the different thermal conductivities.

22 Claims, 7 Drawing Sheets

(51) Int. Cl.
    *H01S 3/04*         (2006.01)
    *H01S 3/067*       (2006.01)

(56)         References Cited

U.S. PATENT DOCUMENTS

| 10,007,077 B2 | 6/2018 | Johnson | |
| 2008/0198880 A1* | 8/2008 | Munroe | H01S 3/042 |
| | | | 372/6 |
| 2010/0247055 A1 | 9/2010 | Arashitani et al. | |
| 2012/0085518 A1 | 4/2012 | Ichkahn et al. | |
| 2014/0240818 A1* | 8/2014 | Taya | H01S 3/06704 |
| | | | 359/341.1 |
| 2018/0175577 A1* | 6/2018 | Hodges | H01S 3/0407 |
| 2019/0280449 A1* | 9/2019 | Hodges | H01S 3/06704 |

FOREIGN PATENT DOCUMENTS

| JP | 2004031480 A | * | 1/2004 | ......... H01S 3/06758 |
| WO | 2014032033 A2 | | 2/2014 | |
| WO | WO 2020048239 A1 | * | 3/2020 | ........... H01S 3/0405 |

OTHER PUBLICATIONS

Yan, Mingjian , et al., "Theoretical and Experimental Studies on Direct-liquid-cooling Fiber-cooling Mode Control Technology in High-power Fiber Lasers", Applied Optics, Feb. 2019, pp. 1577-1586.

Zhaokai, Lou , et al., "Increasing the SBS Threshold by Applying a Flexible Temperature Modulation Technique with Temperature Measurement of the Fiber Core", Optics Express, Apr. 2020, vol. 28, No. 9, 13-pgs.

Eilchi, Maryann , et al., "Heat Generation and Removal in Fiber Lasers", Open Access peer-reviewed Chapter, Mar. 2016, 25 pgs.

* cited by examiner

TEMPERATURE CONTROL FOR COILED GAIN FIBER IN FIBER AMPLIFIER

BACKGROUND OF THE DISCLOSURE

In a fiber amplifier, laser light is transmitted through a gain fiber that is doped with a dopant, such as erbium, neodymium, ytterbium, and the like. At the same time, ions in the doped gain fiber are energized using pump light, which is provided from a pump laser diode at a different wavelength. Photons of the laser light interact with the energized ions, causing the ions to give up some of their energy in the form of photons at the same wavelength as the photons of the laser light, with the ions returning to a lower energy state. The laser light is thereby amplified as it passes through the doped gain fiber.

High-power fiber amplifiers that produce high-power laser output have several challenges not encountered in a typical fiber amplifier used for optical communications. For example, amplifier systems having high-power fiber amplifiers can produce high temperatures during use. To control the heat produced, liquid-cooled cold plates or thermoelectric coolers can be used to cool the gain fiber of the fiber amplifier.

Also, amplifier systems having high-power fiber amplifiers can experience Stimulated Brillouin Scattering (SBS) during use. SBS is a deleterious, non-linear process that limits the output power of the amplifier system and poses a damage risk to the system's components. SBS is caused when the linewidth of the laser light is too narrow for the combination of output power density and fiber length in the amplifier system. In extreme cases, SBS can cause catastrophic damage to the amplifier and laser source.

For example, SBS can occur when narrow-band laser light in a fiber amplifier is simply propagated through a passive fiber. When a certain power threshold has been reached, SBS develops, and most of the power of an incident beam in the fiber can be reflected. Nevertheless, to maximize output power, current amplifier systems often have their operational limits pushed right to the boundary of the onset of SBS so high-power levels can be achieved.

It has been observed that controlling the temperature of a gain fiber globally or even locally can suppress SBS. As expected, however, controlling the temperature of a gain fiber can be complicated in high-power fiber laser systems due to issues with compactness, safety, operational life, space efficiency, and the like that need to be considered for such systems.

The subject matter of the present disclosure is directed to overcoming, or at least reducing the effects of, one or more of the problems set forth above.

SUMMARY OF THE DISCLOSURE

A temperature controller for a gain fiber of a fiber amplifier disclosed herein comprises a heat transfer structure and at least one temperature sink. The heat transfer structure is disposed in thermal contact with the gain fiber and is configured to support the gain fiber. The at least one temperature sink is configured to dissipate heat. At least one first portion of the at least one temperature sink is disposed in first thermal conductivity with at least one first section of the heat transfer structure, and at least one second portion of the at least one temperature sink is disposed in second thermal conductivity with at least one second section of the heat transfer structure. The first thermal conductivity conducts the heat from at least one first part of the gain fiber to the at least one temperature sink differently than the second thermal conductivity conducts the heat from at least one second part of the gain fiber.

Ultimately, the difference in the thermal conductivities conducting the heat differently from the gain fiber can produce different temperature levels in the first and second parts of the gain fiber to mitigate an onset of Stimulated Brillouin Scattering (SBS) in the gain fiber.

In one example, the heat transfer structure can have a plurality of sections, each having a thermal conductivity—with some being different than others. For instance, different material properties used for the sections can be configured to provide the thermal conductivities. Additionally or alternatively, different material thicknesses of the sections can be configured to provide the respective first and second thermal conductivities. Moreover, the at least one temperature sink can have at least two regions, each being configured to dissipate the heat at a different heat transfer rate.

A method disclosed herein comprises: driving at least one fiber amplifier having a gain fiber disposed along a laser light path of a high-power amplifier system; cooling at least one temperature sink disposed in thermal contact with a heat transfer structure supporting the gain fiber; transferring first heat from at least one first part of the gain fiber to the at least one temperature sink using at least one first thermal conductivity of at least one first section of the heat transfer structure; transferring second heat from at least one second part of the gain fiber to the at least one temperature sink using at least one second thermal conductivity of at least one second section of the heat transfer structure; and mitigating an onset of Stimulated Brillouin Scattering (SBS) on the laser light path by conducting the first heat with the at least one first thermal conductivity differently than conducting the second heat with the at least one second thermal conductivity.

The foregoing summary is not intended to summarize each potential embodiment or every aspect of the present disclosure.

DETAILED DESCRIPTION OF THE DISCLOSURE

Figures 1, 2, 3:
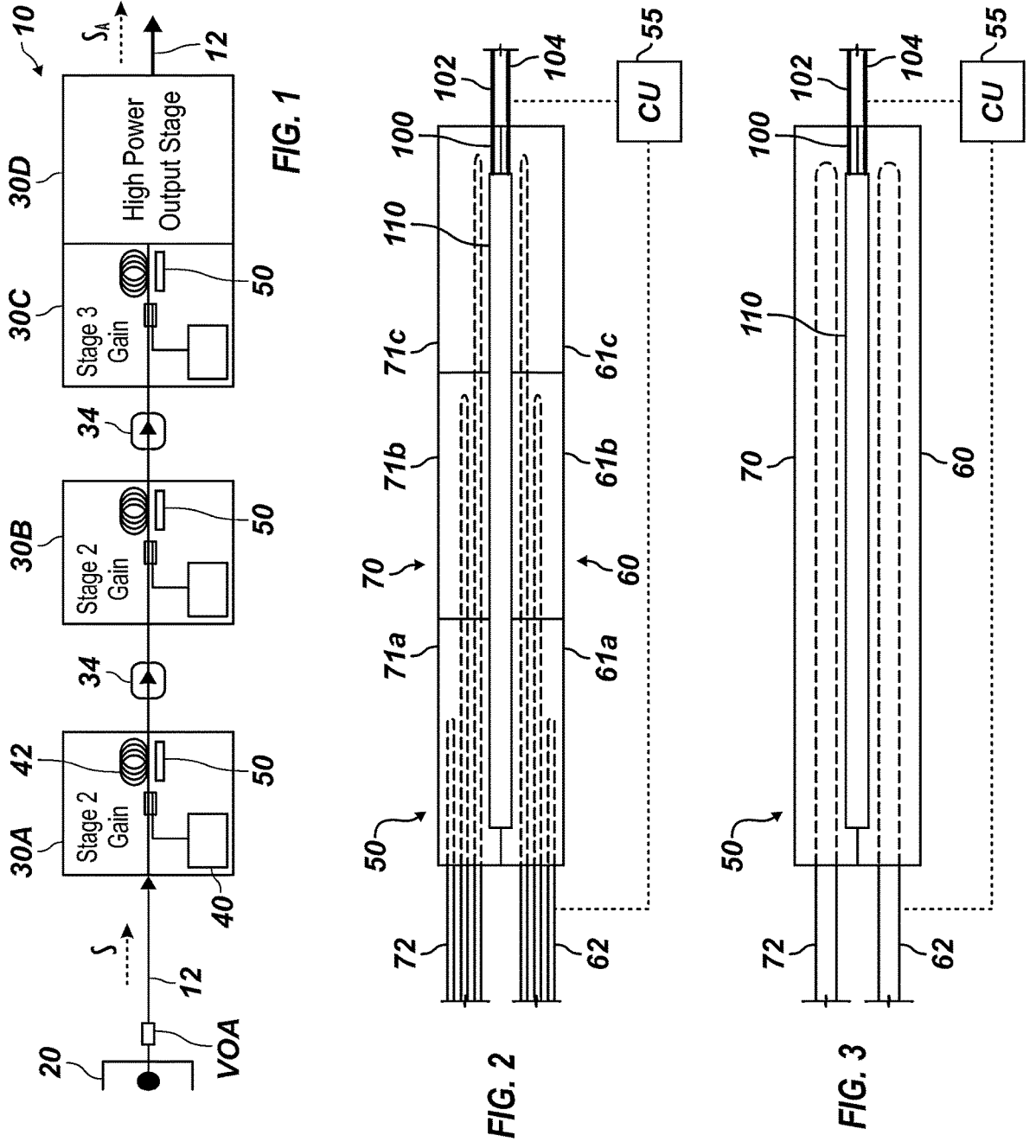
FIG. 1 illustrates a high-power amplifier system having temperature controllers to mitigate Stimulated Brillouin Scattering (SBS) according to the present disclosure.
FIG. 2 schematically illustrates a temperature controller for a coiled gain fiber according to the present disclosure.
FIG. 3 schematically illustrates another temperature controller for a coiled gain fiber according to the present disclosure.

FIG. 1 illustrates a high-power amplifier system 10 having temperature controllers 50 to mitigate Stimulated Brillouin Scattering (SBS) according to the present disclosure. The high-power amplifier system 10 includes an input 20 from a broadband seed source, which can include input from any suitable high-power laser source for the application at hand. Seed laser light S from the seed input 20 passes along a laser light path 12 of optical fiber and the like through several gain stages 30A-C, which include fiber amplifiers. For example, the fiber amplifiers of the stages 30A-C can each include a pump laser 40 having a laser diode and a pump drive to inject pump light into a doped fiber coil 42 at a given wavelength to excite ions in the doped fiber coil 42. In turn, energy in the gain stages 30A-C is transferred to the seed laser light S passing through the laser light path 12 when the excited ions in the doped fiber coil 42 return to an unexcited state.

Ultimately, amplified laser light SA is output from the system's output stage 30D along the laser light path 12. This amplified laser light SA can then be used for the purposes of a particular implementation. As discussed below, for example, a directed energy system can use the amplified laser light SA from this and additional amplifier systems 10 to produce directed energy output.

As shown in this example, the optical topology has multiple gain stages 30A-C, which use injections of pump lasers 40 to doped fiber coils 42 to amplify the seed laser light S to produce final amplified laser light SA. In the present arrangement, three gain stages 30A-C are shown, but more or less can be used. In general, the first and second gain stages 30A and 30B help provide gain, but the final output power of the amplifier system 10 from the final output stage 30D may be almost entirely determined by the third gain stage 30C.

After the first gain stage 30A, the laser light S passes an optical isolator 34 before reaching the second gain stage 30B, where the laser light is further amplified. The laser light S then passes an optical isolator 34 before reaching the third gain stage 30C, where the laser light S is even further amplified. After the third gain stage 30C, the amplifier system 10 includes a high-power output stage 40. The optical isolators 34 between the gain stages 30A-C can use any suitable optical components to prevent or at least reduce back reflection and can be configured to the optical power, wavelengths, and other characteristics associated with the implementation.

Although the stages 30A-C of the amplifier systems 10 are connected in series and add gain (and thus increase output power) of the amplifier system 10, a directed energy system may require higher output power than just one amplifier system 10 can produce. Accordingly, several of the multi-stage amplifier systems 10 of the present disclosure can be part of a larger directed energy system.

Such a larger system can be (i) a directed energy high power laser system used to concentrate laser beam power within a small area (commonly referred to as a focal spot or a target "hit-spot" area) to induce thermal and/or material modifications at a remotely located target; (ii) an industrial laser processing system that uses a high-power laser energy source for material processing (cutting, welding, etc.) in metals; or (iii) another such high-power laser system.

As noted, SBS is a non-linear effect in high-power amplifiers that can lead to catastrophic damage. In the system 10, the temperature controllers 50 (e.g., cooling units) are used to control the temperatures of the gain fibers in the doped fiber coils 42 of the amplifier system 10. As discussed in more detail below, the temperature controllers 50 can be used to prevent the onset of SBS by producing an average temperature of the gain fiber used in the gain stages 30A-C. The averaging of the temperatures is produced by a distribution of different temperature levels in sections or zones along different parts of each gain fiber of the coil 42 in the respective gain stage 30A-C. The purpose of the temperature control is not to merely cool the gain fiber, as would typically be the case in cooling a fiber in an optical device. Instead, the averaging of the temperature produced by the distribution of different temperature levels (e.g., high and low) in sections or zones of the gain fiber of the coils 42 reduces the possible onset of SBS in the gain fiber of the coils 42 in the gain stages 30A-C. Stated another way, using the temperature distribution disclosed herein, each of the gain stages 30A-C can achieve a higher output power before backward power from SBS increases beyond an unacceptable threshold. Effective mitigation of SBS using the temperature controllers 50 in the fiber amplifiers of the amplifier system 10 as disclosed herein can make the amplifier system 10 much more robust to non-ideal installation and operating conditions.

FIG. 2 schematically illustrates a temperature controller 50 for a coiled gain fiber 100 according to the present disclosure. The temperature controller 50 allows specific regions of the coiled gain fiber 100 to be cooled separately and independently. To do this, the temperature controller 50 provides fixed and variable thermal dissipation at prescribed zones, sections, or parts along the length of the coiled gain fiber 100. As a result, the different zones of thermal dissipation produce gradients of temperature along the length of the fiber 100.

Here, the gain fiber 100 is coiled in a structure 110 between temperature sinks or cooling plates 60, 70. Here, one or both of the cooling plates 60, 70 can have different cooling sections 61a-c, 71a-c. The cooling sections 61a-c, 71a-c can provide different thermal dissipation by having different heat transfer rates (flow rates and/or initial temperature) of the coolant (e.g., water) that is passed through the flow tubes 62, 72 for the individual sections 61a-c, 71a-c.

In this example, three cooling sections 61a-c, 71a-c are shown for both cooling plates 60, 70, but more or fewer sections can be used. Likewise, only one plate may comprise sections. Although the cooling sections 61a-c, 71a-c to produce the zones for the gain fiber 100 can be well organized, symmetrical, and the like, this is not strictly necessary. Organization can facilitate the manufacture and assembly of the controller 50. However, the differences in temperature gradient produced along the length of the gain fiber 100 by the different thermal dissipation has the ultimate goal of mitigating SBS and can be arranged for that purpose.

A control unit 55 of the temperature controller 50 can monitor the temperature of the gain fiber 100 and can monitor and control the temperature(s) associated with the temperature sinks or cooling plates 60, 70. To monitor the fiber's temperature at least externally, the control unit 55 can use one or more thermal imagers or thermocouples. The temperature of the fiber core of the gain fiber can also be determined by using optical frequency domain reflectometer (OFDR) techniques by the control unit 55.

FIG. 3 schematically illustrates another temperature controller 50 for a coiled gain fiber 100 according to the present disclosure. As before, this temperature controller 50 also allows specific regions of a coiled gain fiber 100 to be cooled separately and independently. To do this, the temperature controller 50 provides fixed and variable thermal conductivities at prescribed zones, sections, or parts along the length of the coiled gain fiber 100. As a result, the different zones of thermal conductivity produce gradients of temperature along the length of the fiber 100. Although the zones can be well organized, symmetrical, and the like, this is not strictly necessary. Organization can facilitate the manufacture and assembly of the structure 110. However, the differences in temperature gradient produced along the length of the gain fiber 100 by the structure 110 has the ultimate goal of mitigating SBS and can be arranged for that purpose.

In general, the temperature controller 50 includes one or more temperature sinks 60, 70 used to control the temperature (i.e., cool) a length of the gain fiber 100. Here, two temperature sinks 60, 70 in the form of cooling plates are placed together. These cooling plates 60, 70 can be monolithic to provide monolithic heat dissipation. Both cooling plates 60, 70 can be operated together to provide the same monolithic heat dissipation, or the two cooling plates 60, 70 can be operated differently from one another. Further still, one or both of these cooling plates 60, 70 can have different cooling sections or regions, such as discussed above with reference to FIG. 3, having different heat transfer rates (flow rates and/or initial temperature) of the coolant to provide different heat dissipation in different regions.

The gain fiber 100 is wound in a planar winding or coil situated in a heat transfer structure 100 between the plates 60, 70. Typically, an input portion 102 of the gain fiber 100 starts the winding of the coil at a smaller diameter, which increases outward so that an output portion 104 of the gain fiber 100 can leave between the plates 60, 70. The input portion 102 of the gain fiber 100 has a high concentration of power at the smaller radius—i.e., a higher Watts per unit length. As discussed herein, various geometric arrangements can be used for coiling the gain fiber 100, such as planar, cylindrical, and conical windings so that other winding shapes can be used within the spirit of the present disclosure.

To produce the various cooling zones of the temperature controller 50 in the present embodiment of FIG. 3, the heat transfer structure 110 for holding the coil of the gain fiber 100 uses multiple materials in different sections that have different thermal conductivities. The differences in thermal conductivities may be achieved by combinations of material properties and section thicknesses for the different sections. Although the distribution of different temperatures can be achieved in the gain fiber 100 using different cooling regions of the cooling plates 60, 70 alone as in the arrangement of FIG. 2, the use of sections of different thermal conductivities in the arrangement of FIG. 3 provides improved and more discrete temperature control and distribution. Additionally, the arrangement of FIG. 3 provides a more compact arrangement because multiple coils of the gain fiber 100 are not needed nor are multiple individual cooling plates.

The temperature plates 60, 70 can have their temperature controlled by a coolant (e.g., water) that is passed through flow tubes 62, 72 as shown. Alternative forms of temperature control can be used, such as thermoelectric coolers and the like. Either way, during operation, the temperature plates 60, 70 are used to control the temperature of the coil 110 of the gain fiber 100 by dissipating heat from the differing thermal conductivities in the sections of the heat transfer structure 100.

The heat transfer structure 100 disclosed herein reduces SBS by providing several zones with differing thermal conductivities (thermal resistivities). Each zone is designed to provide a cooling path that is suited for the internal optical power and desired external (fiber cladding) temperature of the gain fiber 100 coiled in the heat transfer structure 110. As an example, the maximum temperature for operating the fiber cladding can be about 125 to 150 degrees Celsius, depending on the type of fiber and other factors. For some fibers, the temperature is preferably kept at or below 80 degrees Celsius due to the limitations of the fiber's coating. Different regions, lengths, or parts of the gain fiber 100 are operated at different temperatures from one another below the maximum temperature.

Using the plates 60, 70 and the heat transfer structure 110, the local temperature of sections along the length of the gain fiber 100 can be regulated by multiple conductive zones consisting of different thermal conductivities. As discussed below, fixed and variable variations in thermal conductivities are proposed. The various thermal conductivities can be achieved by selecting the properties and the thicknesses of different materials used in the heat transfer structure 100 in addition to controlling the coolant flow rates through the cold plate(s) 60, 70.

As before, a control unit 55 of the temperature controller 50 in FIG. 3 can monitor the temperature of the gain fiber 100 and can monitor and control the temperature(s) associated with the temperature sinks or cooling plates 60, 70. To monitor the fiber's temperature at least externally, the control unit 55 can use one or more thermal imagers or thermocouples. The temperature of the fiber core of the gain fiber can also be determined by using optical frequency domain reflectometer (OFDR) techniques by the control unit 55.

Figures 4A, 4B:
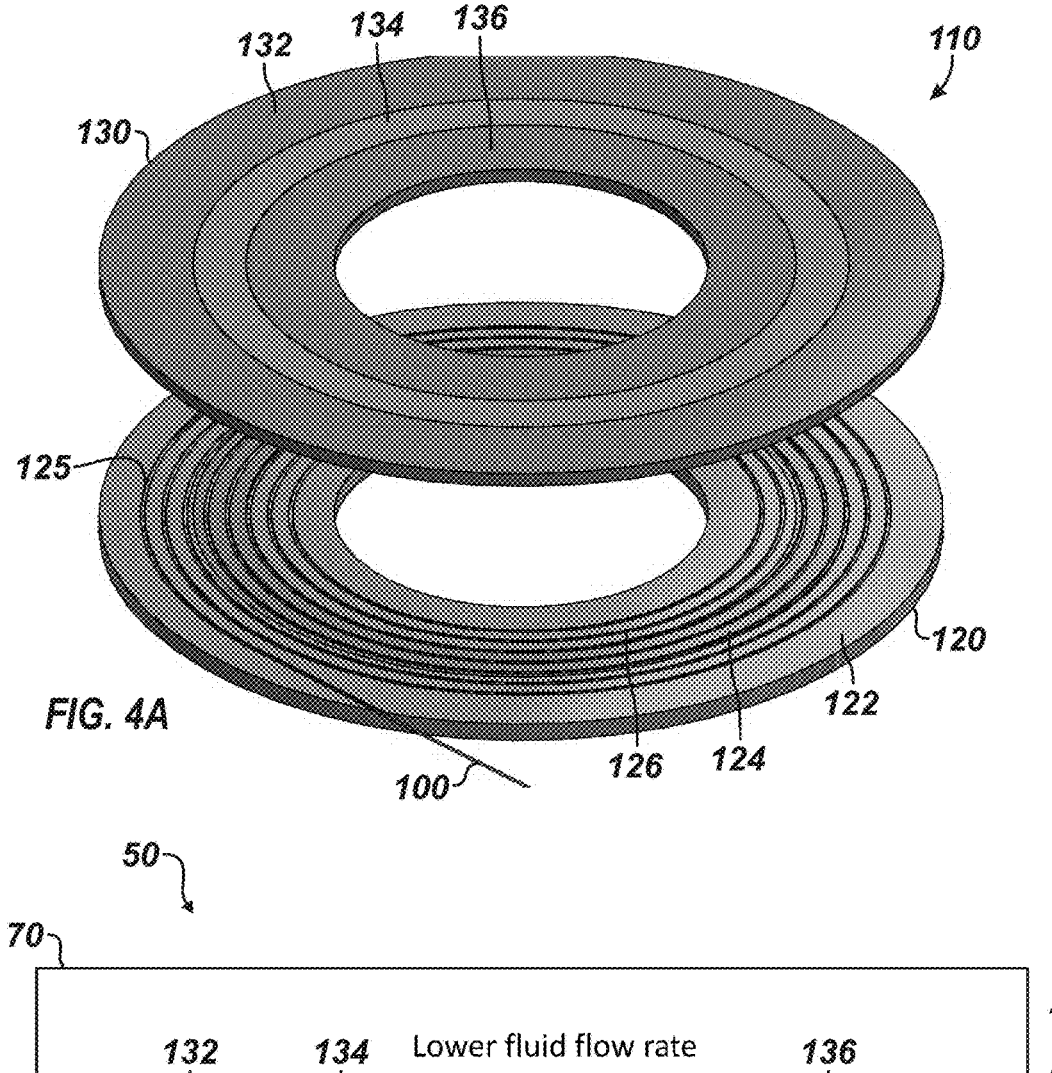
FIG. 4A illustrates a perspective view of a heat transfer structure for a temperature controller according to a first embodiment of the present disclosure.
FIG. 4B schematically illustrates a side view of the temperature controller having a heat transfer structure of FIG. 4A.

FIG. 4A illustrates a perspective view of a heat transfer structure 110 for a temperature controller according to a first embodiment of the present disclosure. The heat transfer structure includes first and second interfaces 120, 130, which are disk-shaped to accommodate the planar winding of the gain fiber 100 in a flat coil. The interfaces 120, 130 are configured to be placed together with the winding of the fiber 100 disposed between them. Each interface 120, 130 has a plurality of zones, sections, or the like having material of different thermal conductivities (or thermal resistivities).

In general, the sections of the interfaces 120, 130 can be composed of a metallic material (e.g., aluminum, copper, etc.), a ceramic material, an insulative material, a conductive material, or the like. Different thicknesses and material properties allow for fixed tuning of the relative thermal conductivities in the various sections. Some sections can have high thermal conductivity, while other sections have low thermal conductivity. The temperature sinks or cold plates that rest against the interfaces 120,130 can also have different flow rates for dynamic tuning of the relative thermal conductivities.

In the present example, the first interface 120 has three sections 122, 124, 126 with different thermal conductivities (put alternatively, different thermal resistivities), and the second interface 130 has three sections 132, 134, 136 with different thermal conductivities. The sections 122, 124, 126 and 132, 134, 136 can be arranged in any appropriate way and are shown as being disk-shaped in the present example. Depending on the implementation, any number of sections can be used, and some of the sections can have the same thermal conductivities or each section can have a unique thermal conductivity. Likewise, the sections 122, 124, 126 on one interface 120 may match or counter the sections 132, 134, 136 on the other interface 130 in a symmetrical way, but other configurations can be used.

Finally, one of the interfaces 120 can define a groove or slot 125 in which the gain fiber 100 is held. The opposing interface 130 may not include such a feature and may instead have a flat surface. The gain fiber 100 is intended to make thermal contact with the surfaces of the interfaces 120, 130. The groove 125 spirals outward from an inner diameter to an outer diameter across the sections 122, 124, 126 of the interface 120 so the fiber 100 can form a flat coil. The gain fiber 100 can be installed in structure 110 by feeding the fiber 100 through the groove 125 between the interfaces 120, 130 when they are stacked together.

FIG. 4B schematically illustrates a side view of a temperature controller having features of a heat transfer structure as in FIG. 4A. The opposing thermal interfaces 120, 130 of the structure 100 are placed between opposing cooling plates 60, 70, which can be cooled by fluid flow. One interface 120 as noted above can have the groove 125 in which the gain fiber 100 is placed, while the other interface 130 can have a flat surface to enclose the gain fiber 100 in the groove 125. In a preferred arrangement, the groove 125 is a V-shaped groove so the gain fiber 100 can contact three surfaces.

The cooling plates 60, 70 can be operated to provide comparable cooling from both sides of the structure 110. Alternatively and as shown, the cooling plates 60, 70 may be operated with different flow rates to provide different cooling across a cooling differential. In any event, as noted above, the interfaces 120, 130 can have several sections with different thermal conductivities.

In the present example of the first interface 120, the second section 124 is depicted with a low thermal conductivity compared to the first and third sections 122, 126. In that sense, the second section 124 would tend to dissipate less heat from the length of the fiber 100 associated with the second section 124 compared to the other sections 122, 126. For the second interface 130, the second section 134 is depicted with a higher thermal conductivity compared to the first and third sections 132, 136 so that the second section 134 would tend to dissipate more heat from the length of the fiber 100 associated with the second section 134 compared to the others. The differences in the thermal conductivities for the sections can be achieved using different materials for the sections and/or different thicknesses (T) of the materials. Each section can be formed of a singular material as shown, but each section could be formed from layers of different materials. The arrangement shown here is presented only as an example, and configurations of the present disclosure may be more or less complex.

Figure 4C:
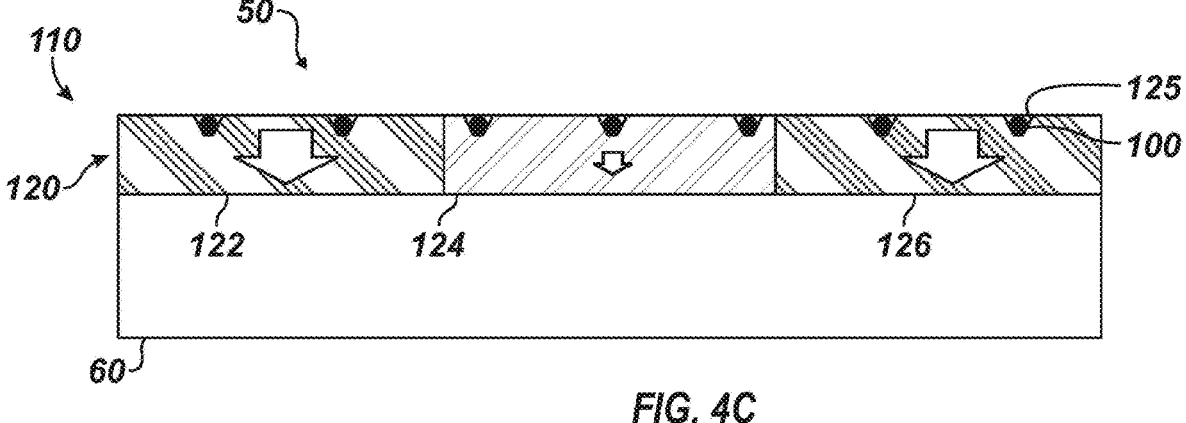
FIG. 4C schematically illustrates a variation of the temperature controller of FIG. 4B.
Figure 4D:
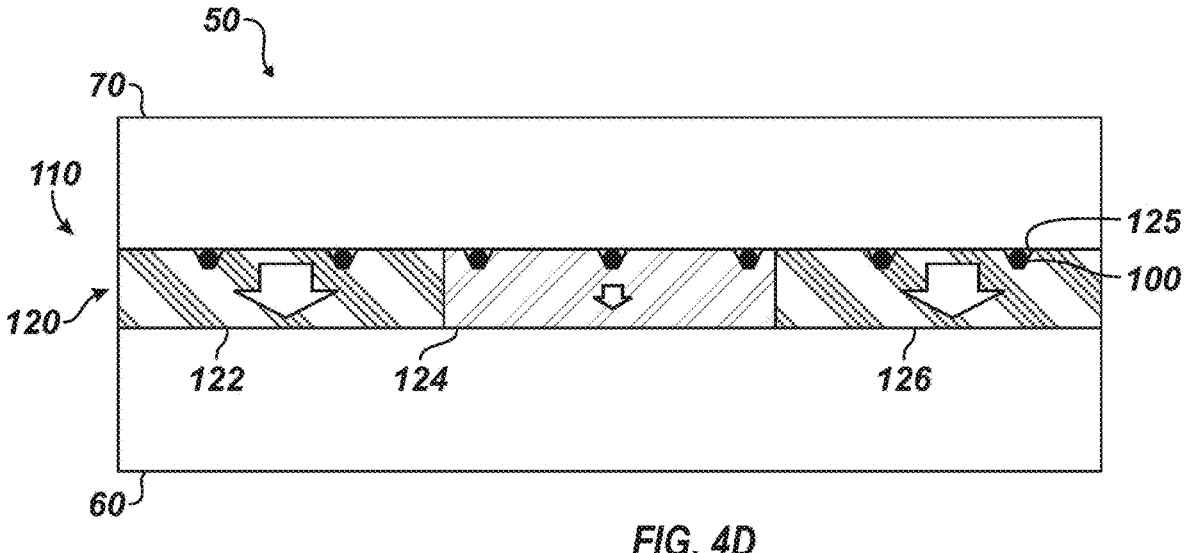
FIG. 4D schematically illustrates another variation of the temperature controller of FIG. 4B.

FIG. 4C schematically illustrates a variation of the temperature controller 50 of FIG. 4B. Here, the controller 50 includes one temperature sink 60 and has one interface 120 with sections 122, 124, 126 and grooves 125 for the gain fiber 100. FIG. 4D schematically illustrates another variation of the temperature controller 50 of FIG. 4B. Here, the controller 50 has two temperature sinks 60, 70 and has one interface 120 with sections 122, 124, 126 and grooves 125 for the gain fiber 100.

Figure 5B:
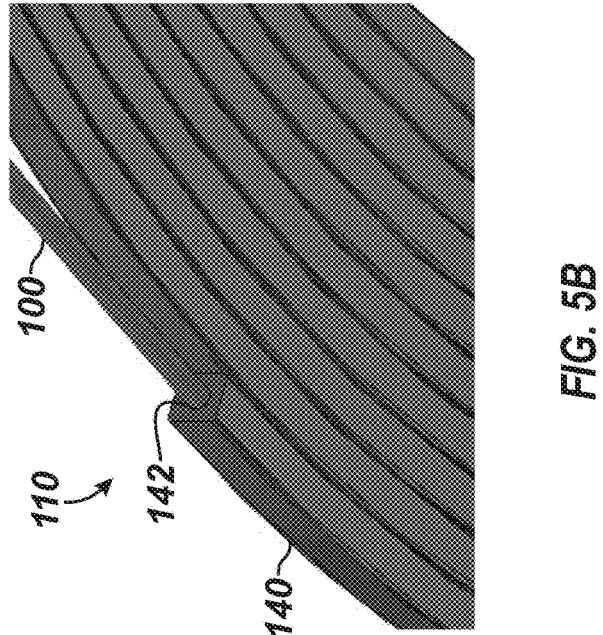
FIG. 5B illustrates an isolated view of encapsulation for the gain fiber in the controller of FIG. 5A.
Figure 5A:
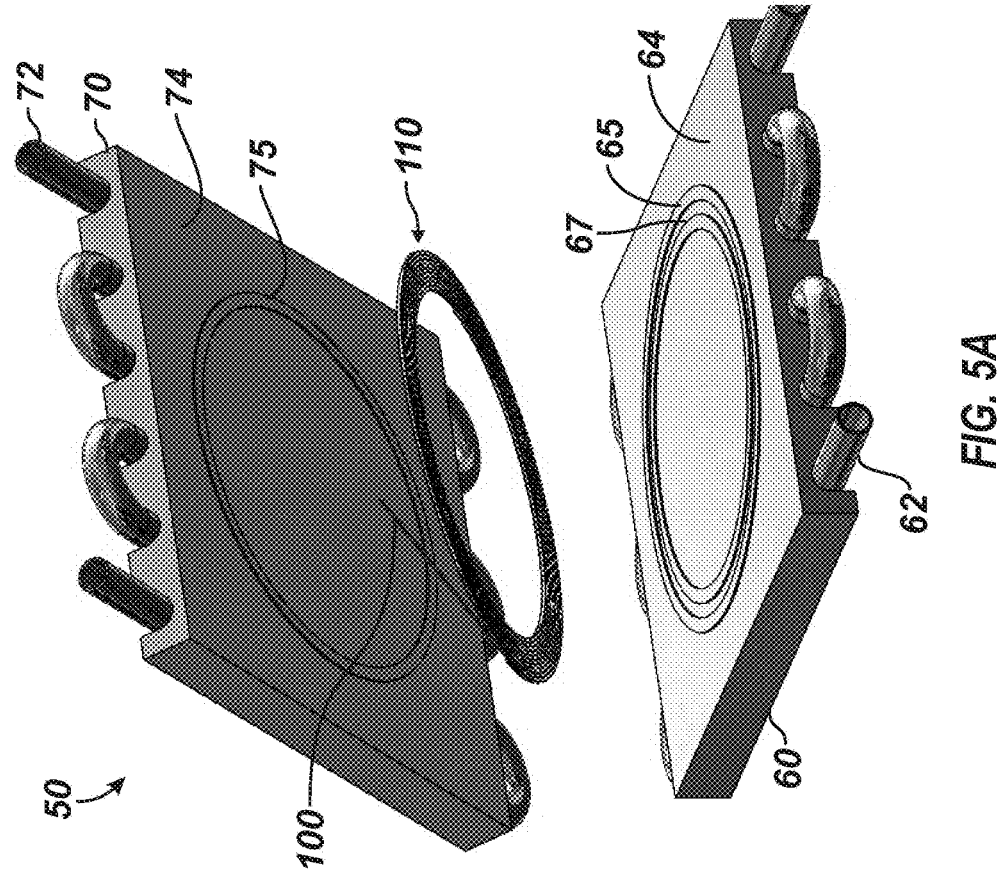
FIG. 5A illustrates a perspective view of a temperature controller according to a second embodiment of the present disclosure.

FIG. 5A illustrates a perspective view of a temperature controller 50 according to a second embodiment of the present disclosure. The temperature controller 50 includes opposing cooling plates 60, 70, which can be cooled by fluid flow through tubes 62, 72 as before. The heat transfer structure 110 holds the gain fiber 100 and is placed between the faces 64, 74 of the plates 60, 70 which are assembled on opposing sides of the heat transfer structure 110. In this embodiment, the heat transfer structure 110 is an encasement or encapsulation 140 shown in FIG. 5B, which is disposed about the gain fiber 100.

To produce the various cooling zones of the temperature controller 50, the surfaces of the temperature sinks or cold plates 60,70 that make contact with the encasement 140 of the gain fiber 100 are selectively embossed or recessed according to the placement of the cooling zones. For example, each face 64, 74 can have a set of one or more zones or sections 65, 75 in the form of ridges or embossed wells that make contact with the encasement 140 on the gain fiber 100.

The encasement 150 is preferably aluminum, copper, or other suitable thermally conductive material. The metal encasement 150 can be made with any number of geometries and can include a square or round external surface and can include a round or polygonal interior surface. Gaps between the interior of the encasement and the fiber coating may be filled with fluid to improve conductive heat transfer.

In the present example, the face 64 of one plate 60 has two raised circular ridges 65 with an intermediate well 67 between them, and the face 74 of the other plate 70 has one raised circular ridge 75 generally configured to position adjacent the intermediate well 67 of the other face 64. This arrangement is only presented as an example, and configurations may be more or less complex. The different ridges and embossed wells for the sections create different thermal contacts with different sections of the heat transfer structure 110. Some air space may be provided between the faces 64, 74 and the encasement 140. Alternatively, insulative or filler material can be used in the embossed wells so the faces 64, 74 are more planar to sandwich the structure 110 between the plates 60, 70.

In addition to the sections 65, 75 (e.g., ridges or embossed wells), dynamic adjustment of thermal dissipation can be achieved by regulating the flow rate of coolant (e.g., water) passed through each of the opposed cold plates 60, 70. Finally, the coil in which the encasement 140 and the gain fiber 100 are arranged is a flat, planar coil in the present example. Other configurations can be used. For example, the encasement 140 and the gain fiber 100 can be wound into a cylindrical or another axial coil to engage with one or more temperature sinks. For example, a temperature sink can be disposed in thermal contact with an inner surface of the axial coil, while another sink can be disposed in thermal contact with an outer surface of the axial coil.

FIG. 5B illustrates an isolated view of the encapsulation 140 for the structure 110 on the gain fiber 100 of FIG. 5A. As noted above, the encapsulation 140 can be composed of a thermally conductive material, such as copper or other metallic material. The gain fiber 100 runs through a central passage or bore 142 of the encapsulation 140. The passage 142 can be triangular, round, or the like in shape to make contact with the cladding of the fiber 110. Both the encapsulation 140 and the fiber 100 are wound in the coil for placement between the plates (60, 70).

The encapsulation 140 can be manufactured as an extruded length of metal having the central passage 142. Alternatively, the encapsulation 140 can be formed from one or more metallic strips that form sidewalls to surround a central passage or space 142 for the gain fiber 100. For assembly, the gain fiber 100 can be passed through the central passage 142 of the extruded encapsulation 140 to make thermal contact with the material of the encapsulation 140. The structure 110 can then be formed into a coil for eventual assembly into a temperature controller 50. Advantageously, the coil of encapsulation 140 and fiber 100 will retain its shape, which can facilitate assembly because the fiber 100 alone would tend to uncoil. As will be appreciated, the manufacture of the structure 110 having the gain fiber 100 in the encapsulation 140 is careful not to place undue hoop stress on the fiber 100 and does not damage the fiber's cladding and the like.

Figure 5C:
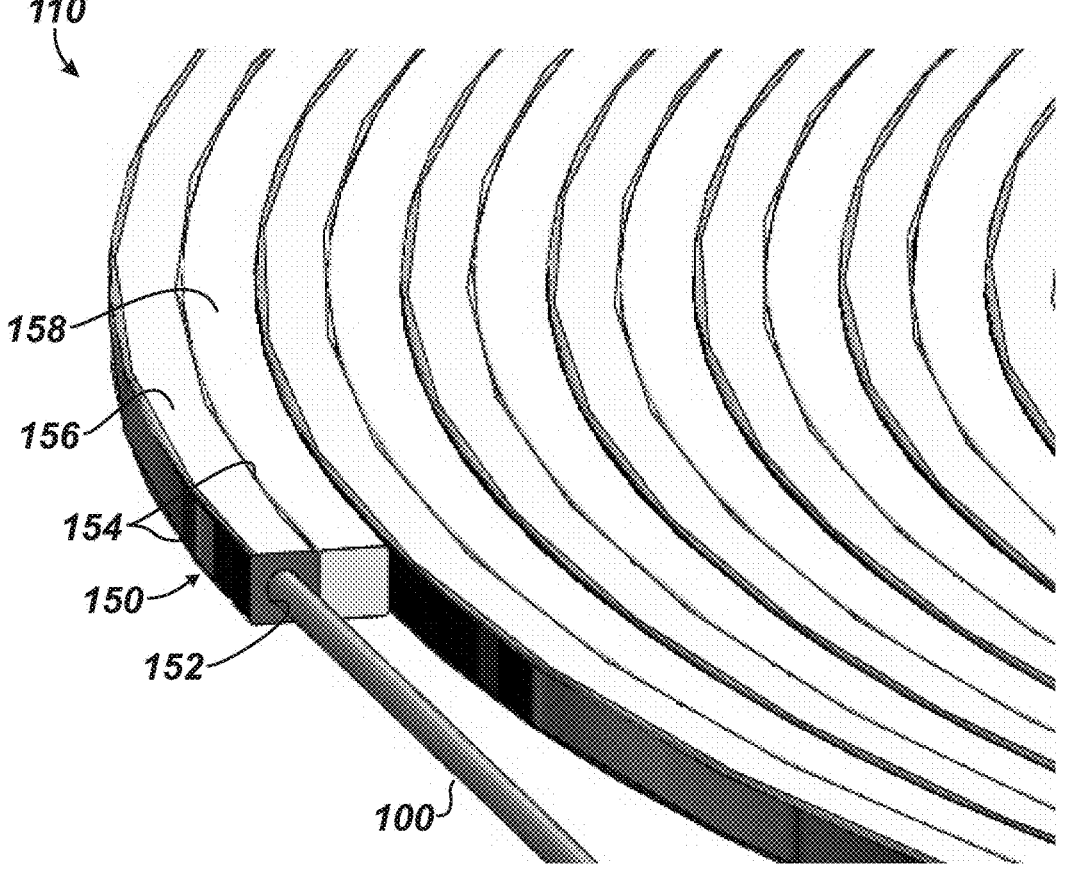
FIG. 5C illustrates an isolated view of alternative encapsulation for the gain fiber in the temperature controller of FIG. 5A.

FIG. 5C illustrates an isolated view of alternative encapsulation 150 for the gain fiber 100, which is disposed in a central passage 152 of the encapsulation 150. Here, spacer material 158 can be wound between the windings of the encapsulation 150. The spacer material 156 can be insulative. Accordingly, top and bottom surfaces 156 of the encapsulation 150 can make thermal contact respectively with the opposing temperature sinks (60, 70), while inner and outer sidewalls 154 of the windings of the encapsulation 150 can be isolated from one another by the interleaved spacer material 158. The present arrangement can help different separate lengths of the wound gain fiber 100 from one another so thermal variations produced according to the purposes of the present disclosure can be more accurately differentiated from one another.

As noted above, shapes other than a flat, planar coil can be used for the winding of the gain fiber 100, and a heat transfer structure 110 can have a geometrical shape to accommodate these windings. For instance, various temperature zones, sections, or parts can also be achieved by winding the gain fiber 100 around or within an axial (e.g., cylindrical or conical) heat transfer structure 110 made of layers or rings of materials with different thermal properties and/or thicknesses. Each ring can conduct to an independent temperature sink that has a unique cooling flow rate. Alternatively, each ring can conduct to a common temperature sink and its common flow rate. Revolved V-grooves in the inner or outer surfaces of the rings may facilitate the manufacturing process and enhance thermal contact between the gain fiber 100 and the axial heat transfer structure 110.

The gain fiber 100 wound on or within the axial heat transfer structure 110 can have a constant or variable bend radius. For example, the axial heat transfer structure 110 may have a conical shape, an hourglass shape, an egg shape, or another non-cylindrical form. Other volumes of revolution are possible and may be designed to meet specific operational requirements.

Figure 6A:
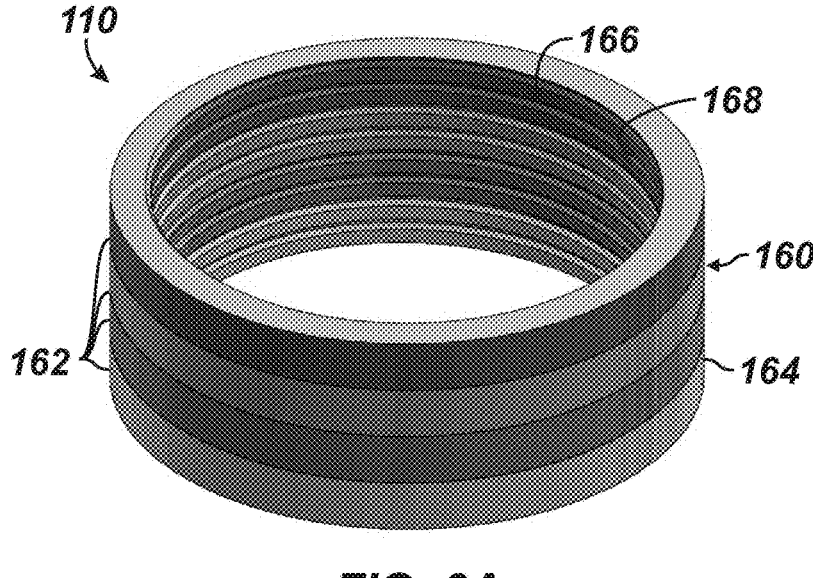
FIG. 6A illustrates a perspective view of a cylindrical heat transfer structure having stacked interfaces for a temperature controller of the present disclosure.
Figure 6B:
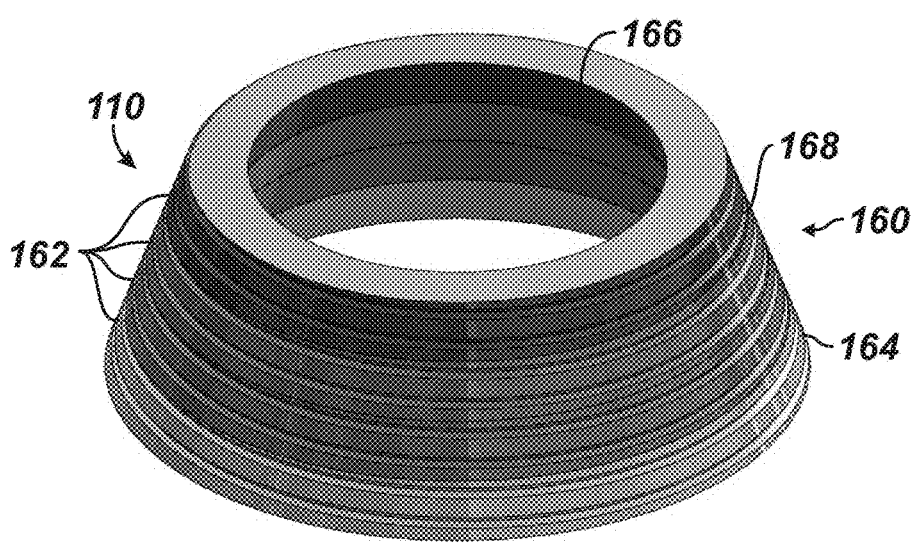
FIG. 6B illustrates a perspective view of a conical heat transfer structure having stacked interfaces for a temperature controller of the present disclosure.

For example, FIGS. 6A-6B illustrate perspective views of axial heat transfer structures 110 having an interface 160 of stacked rings 162 for a temperature controller of the present disclosure. In FIG. 6A, the axial structure 110 is cylindrical. Meanwhile, the axial structure 110 in FIG. 6B is conical.

Each of the interfaces 160 can have rings 162 with different thermal conductivities and/or thicknesses, with some rings 162 being the same and other rings 162 being different, with all rings 162 being different, etc. Four stacked rings 162 for the interface 160 are shown, but more or less can be used. As in FIG. 6A, inner surfaces 166 of the rings 162 can have a spiraling groove 168 to hold the gain fiber (not shown), which is coiled from one end of the structure 110 to the other. The gain fiber can be wound inside the inner surfaces 166 at the tension of the fiber. Alternatively as in FIG. 6B, outer surfaces 164 of the rings 162 can have a spiraling groove 168 to hold the gain fiber.

Figure 7A:
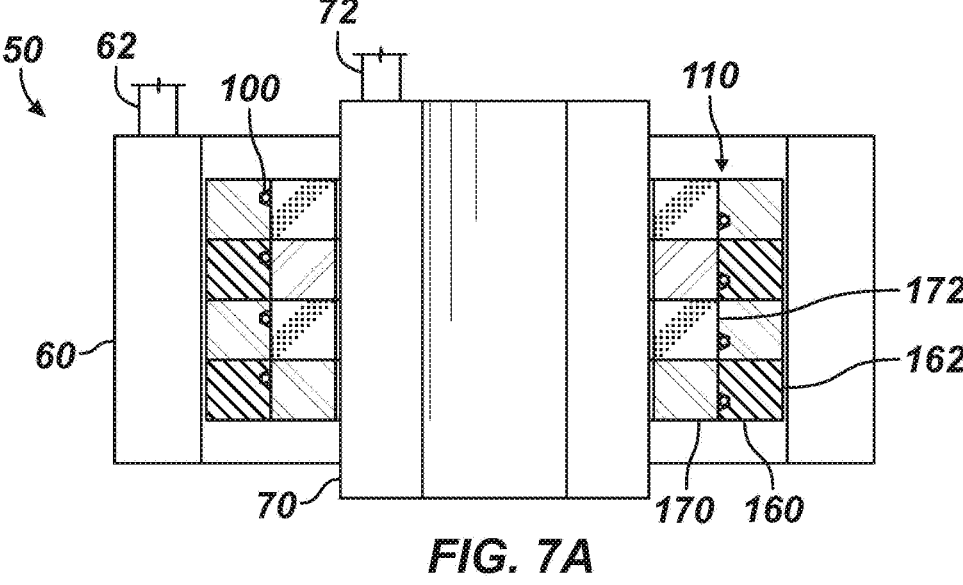
FIG. 7A schematically illustrates another temperature controller for a coiled gain fiber according to the present disclosure.

A temperature controller of the present disclosure can have an axial structure 110 as noted above having one or more of the interfaces of the stacked rings. As one example, FIG. 7A schematically illustrates a temperature controller 50 for a coiled gain fiber 100 according to the present disclosure. In general, the temperature controller 50 can have one or more temperature sinks 60, 70 with a cylindrical shape. Here, two sinks 60, 70 are shown in this example. The sinks 60, 70 can be cooled as before, such as by fluid flow through tubes 62, 72, and they can be cooled at the same or different rates. The axial heat transfer structure 110 is disposed in the annular space between the temperatures sinks 60, 70 and is placed in thermal contact with them. The axial heat transfer structure 110 is also cylindrical and includes a first (outer) interface 160 having rings 162 of different thermal conductivities stacked on one another and having the gain fiber 100 wound thereabout. A second (inner) interface 170 of stacked rings 172 can be used with alternating and opposing thermal conductivities. Again, this arrangement is only presented as an example, and configurations may be more or less complex.

Figure 7B:
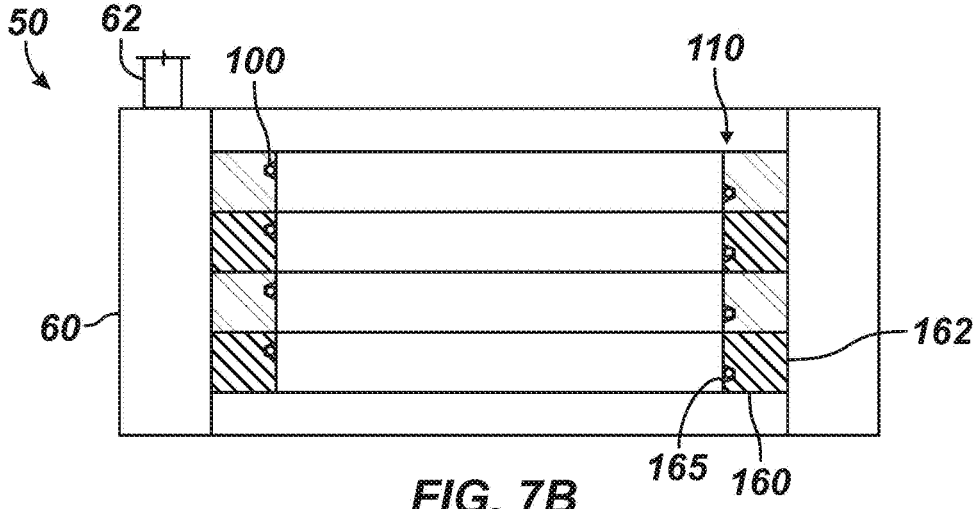
FIG. 7B schematically illustrates a variation of the temperature controller of FIG. 7A.

FIG. 7B schematically illustrates a variation of the temperature controller 50 of FIG. 7A. Here, the controller 50 includes one temperature sink 60 and has one interface 160 for the axial heat transfer structure 110. The interface 160 has several sections or stacked rings 162 and a groove 165 for the gain fiber 100. Another variation would include one interface 160 with stacked rings 162 and grooves 165 for the gain fiber 100, but would also include inner and outer arranged temperature sinks.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A temperature controller for a gain fiber of a fiber amplifier, the temperature controller comprising:

a heat transfer structure disposed in thermal contact with the gain fiber and being configured to support the gain fiber; and at least one temperature sink being configured to dissipate heat, at least one first portion of the at least one temperature sink being disposed in first thermal contact with at least one first section of the heat transfer structure, at least one second portion of the at least one temperature sink being disposed in second thermal contact with at least one second section of the heat transfer structure, the first section comprising a first material having a first thermal conductivity, and the second section comprising a second material different than the first material and having a second thermal conductivity different than the first thermal conductivity, wherein the first thermal conductivity conducts the heat from at least one first part of the gain fiber to the at least one temperature sink differently than the second thermal conductivity conducts the heat from at least one second part of the gain fiber.

2. The temperature controller of claim 1, wherein the at least one temperature sink comprises at least two regions, each being configured to dissipate the heat at a different heat transfer rate.

3. The temperature controller of claim 1, wherein the at least one temperature sink comprises: a cooling plate configured for coolant flow; or a thermoelectric cooling device.

4. The temperature controller of claim 1, wherein the heat transfer structure is disposed in thermal contact with the at least one temperature sink, the heat transfer structure defining a groove in a surface thereof, the groove configured to support the gain fiber wound on the surface of the heat transfer structure, the heat transfer structure having a plurality of the at least one first and second sections, the at least one first section having the first thermal conductivity different from the second thermal conductivity of the at least one second section; and wherein the at least one first section having the first thermal conductivity conducts the heat from at least one first part of the gain fiber to the at least one temperature sink differently than the at least one second section having the second thermal conductivity conducts the heat from at least one second part of the gain fiber.

5. The temperature controller of claim 1, comprising first and second of the at least one temperature sink, the first and second temperature sinks each having a face disposed in opposing thermal contact with the heat transfer structure.

6. A temperature controller for a gain fiber of a fiber amplifier, the temperature controller comprising:

a heat transfer structure disposed in thermal contact with the gain fiber and being configured to support the gain fiber; and at least one temperature sink being configured to dissipate heat, at least one first portion of the at least one temperature sink being disposed in first thermal conductivity with at least one first section of the heat transfer structure, at least one second portion of the at least one temperature sink being disposed in second thermal conductivity with at least one second section of the heat transfer structure, first and second of the at least one temperature sink, the first and second temperature sinks each having a face disposed in opposing thermal contact with the heat transfer structure, wherein the first thermal conductivity conducts the heat from at least one first part of the gain fiber to the at least one temperature sink differently than the second thermal conductivity conducts the heat from at least one second part of the gain fiber, wherein the heat transfer structure comprises first and second interfaces each having first and second surfaces, the first surfaces disposed against one another, the first surface of one of the first and second interfaces defining a groove configured to support the gain fiber, the first surface of the other being configured to enclose the gain fiber in the groove, the second surfaces of the first and second interfaces each being disposed in thermal contact with one of the first and second temperature sinks.

7. The temperature controller of claim 6, wherein the first and second interfaces each comprise a plurality of the at least one first and second sections, the at least one first section having the first thermal conductivity different from the second thermal conductivity of the at least one second section, wherein the at least one first section having the first thermal conductivity conducts the heat from at least one first part of the gain fiber to the at least one temperature sink differently than the at least one second section having the second thermal conductivity conducts the heat from at least one second part of the gain fiber.

8. The temperature controller of claim 7, wherein the at least one first and second sections of the first interface are symmetrically arranged relative to the at least one first and second sections of the second interface;

wherein the at least one first and second sections of the first interface are oppositely arranged relative to the at least one first and second sections of the second interface; or wherein the at least one first and second sections of the first interface are arranged in a first arrangement being asymmetrical relative to a second arrangement of the at least one first and second sections of the second interface.

9. The temperature controller of claim 6, wherein the at least one first and second sections for each of the first and second interfaces comprise flat rings arranged in a plane inside one another; cylindrical rings having a same diameter and stacked in a cylinder form on one another; or cylindrical rings having different diameters and stacked in a non-cylindrical form on one another.

10. The temperature controller of claim 1, wherein the at least one first section comprises a first material thickness between the gain fiber and the at least one temperature sink and the at least one second section comprises a second material thickness between the gain fiber and the at least one temperature sink, the first material thickness being different than the second material thickness.

11. The temperature controller of claim 1, wherein the heat transfer structure comprises an encasement having a central passage with the gain fiber disposed therein, the encasement and the gain fiber arranged in a coil.

12. A temperature controller for a gain fiber of a fiber amplifier, the temperature controller comprising:

a heat transfer structure disposed in thermal contact with the gain fiber and being configured to support the gain fiber; and at least one temperature sink being configured to dissipate heat, at least one first portion of the at least one temperature sink being disposed in first thermal conductivity with at least one first section of the heat transfer structure, at least one second portion of the at least one temperature sink being disposed in second thermal conductivity with at least one second section of the heat transfer structure, first and second of the at least one temperature sink, the first and second temperature sinks each having a face disposed in opposing thermal contact with the heat transfer structure, wherein the first thermal conductivity conducts the heat from at least one first part of the gain fiber to the at least one temperature sink differently than the second thermal conductivity conducts the heat from at least one second part of the gain fiber, wherein the heat transfer structure comprises an encasement having a central passage with the gain fiber disposed therein, the encasement and the gain fiber arranged in a coil, wherein at least one of:

the encasement comprises extruded material composed of copper, aluminum, or thermally conductive metal;

the passage of the encasement is filled with fluid to conduct the heat from the gain fiber to the encasement;

the temperature controller comprises first and second of the at least one temperature sink, the first and second temperature sinks each having a face disposed in opposing thermal contact with the heat transfer structure, wherein the faces define one or more ridges and one or more embossed wells configured to provide the first and second thermal conductivities through different amounts of the thermal contact with the first and second sections of the encasement of the heat transfer structure; and windings of the coil comprise an insulator material arranged between adjacent ones of the windings.

13. The temperature controller of claim 1, wherein the difference in the first and second thermal conductivities conducting the heat differently from the gain fiber produce different temperature levels in the first and second parts of the gain fiber to mitigate an onset of Stimulated Brillouin Scattering (SBS) in the gain fiber.

14. A fiber amplifier comprising a temperature controller according to claim 1.

15. A system comprising a plurality of fiber amplifiers disposed in a laser light path and configured to amplify laser light, each of the fiber amplifiers comprising a temperature controller according to claim 1.

16. A temperature controller for a gain fiber of a fiber amplifier, the temperature controller comprising:

at least one temperature sink being configured to dissipate heat; and a heat transfer structure disposed in thermal contact with the at least one temperature sink, the heat transfer structure defining a groove in a surface thereof and having a plurality of sections, at least one first of the sections comprising a first material having a first thermal conductivity, at least one second of the sections comprising a second material having a second thermal conductivity different than the first material, the groove configured to support the gain fiber wound on the surface of the heat transfer structure, wherein the at least one first section having the first thermal conductivity conducts the heat from at least one first part of the gain fiber to the at least one temperature sink differently than the at least one second section having the second thermal conductivity conducts the heat from at least one second part of the gain fiber.

17. A method, comprising:

driving at least one fiber amplifier having a gain fiber disposed along a laser light path of a high-power amplifier system;

cooling at least one temperature sink disposed in thermal contact with a heat transfer structure supporting the gain fiber;

transferring first heat from at least one first part of the gain fiber to the at least one temperature sink using at least one first thermal conductivity of at least one first section of the heat transfer structure;

transferring second heat from at least one second part of the gain fiber to the at least one temperature sink using at least one second thermal conductivity of at least one second section of the heat transfer structure; and mitigating an onset of Stimulated Brillouin Scattering (SBS) on the laser light path by conducting the first heat with the at least one first thermal conductivity differently than conducting the second heat with the at least one second thermal conductivity, wherein transferring the first and second heat using the heat transfer structure comprises using first and second interfaces of the heat transfer structure having the gain fiber supported therebetween, the first interface having a first surface defining a groove configured to support the gain fiber, the second interface having a second surface configured to enclose the gain fiber in the groove; and wherein the first and second interfaces each comprise the at least one first and second sections.

18. The method of claim 17, wherein cooling the at least one temperature sink comprises:

cooling at least two regions of the at least one temperature sink, each region being configured to dissipate the heat at a different heat transfer rate; and/or cooling first and second of the at least one temperature sink disposed in opposing thermal contact with the heat transfer structure.

19. The method of claim 17, wherein using the first and second interfaces of the heat transfer structure comprises:

symmetrically arranging the at least one first and second sections of the first and second interfaces;

oppositely arranging the at least one first and second sections of the first and second interfaces; or asymmetrical arranging a first arrangement of the at least one first and second sections of the first interface relative to a second arrangement of the at least one first and second sections of the second interface.

20. The method of claim 17, wherein transferring the first and second heat comprises:

using a first material property for the at least one first section that is different from a second material property of the at least one second section, the first and second material properties being configured to provide the respective first and second thermal conductivities;

using a first material thickness for the at least one first section that is different from a second material thickness of the at least one second section, the first and second material thicknesses being configured to provide the respective first and second thermal conductivities; or using both the first material property and the first material thickness that are different from the second material property and the second material thickness of the at least one second section.

21. The method of claim 17, wherein transferring the first and second heat using the heat transfer structure comprises encasing the gain fiber in an encasement having a central passage with the gain fiber disposed therein, the encasement and the gain fiber being arranged in a coil.

22. The method of claim 21, wherein transferring the first and second heat comprises conducting the first and second heat with a coolant filled in the passage of the encasement; and/or wherein cooling the at least one temperature sink comprises cooling first and second of the at least one temperature sink disposed in opposing thermal contact with the encasement; and wherein conducting the first heat with the at least one first thermal conductivity differently than conducting the second heat with the at least one second thermal conductivity comprises providing different amounts of the opposing thermal contact between one or more ridges and one or more embossed wells defined in opposing faces of the first and second temperature sinks.

\* \* \* \* \*